(12) United States Patent
Schwegler et al.

(10) Patent No.: US 6,213,143 B1
(45) Date of Patent: *Apr. 10, 2001

(54) LIQUID FILTER WITH INTEGRAL PRESSURE REGULATOR

(75) Inventors: Helmut Schwegler, Pleidelsheim (DE); Uwe Liskow, Seoul (KR); Lorenz Drutu, Kornwestheim (DE); Ulrich Projahn, Leonberg; Bernhard Lucas, Houdelsheim, both of (ES); Wolfgang Bueser, Freiberg (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/740,314

(22) PCT Filed: Aug. 4, 1995

(86) PCT No.: PCT/DE95/01013

§ 371 Date: Oct. 28, 1996

§ 102(e) Date: Oct. 28, 1996

(87) PCT Pub. No.: WO96/07025

PCT Pub. Date: Mar. 7, 1996

(30) Foreign Application Priority Data

Aug. 27, 1994 (DE) .................................................. 44 30 471

(51) Int. Cl.[7] .................................................. F16K 31/12

(52) U.S. Cl. .................... 137/115.27; 137/549; 137/508; 123/514; 123/511; 210/416.4

(58) Field of Search ................................ 137/115.27, 508, 137/549, 544; 123/510, 511, 514; 210/416.4, 446, 443, 435

(56) References Cited

U.S. PATENT DOCUMENTS

| 4,011,848 | * | 3/1977 | Coddington . | |
|---|---|---|---|---|
| 4,959,141 | * | 9/1990 | Anderson | 137/549 |
| 5,078,167 | * | 1/1992 | Brandt | 137/549 |
| 5,433,241 | * | 7/1995 | Robinson | 137/549 |
| 5,435,345 | * | 7/1995 | Robinson | 137/508 |
| 5,533,478 | * | 7/1996 | Robinson | 137/549 |

\* cited by examiner

*Primary Examiner*—John Rivell
*Assistant Examiner*—Ramyar Farid
(74) *Attorney, Agent, or Firm*—Michael J. Striker

(57) ABSTRACT

A liquid filter (1) with a built-in pressure regulator (11) for fuel is proposed, in which the pressure regulator (11) with its diaphragm (32) is mounted on the inside of a cap (14) that has the inflow connector (16) and the tank connector (17). The diaphragm (32), which experiences a flow on its inside, is acted upon by the pressure of the fuel on the clean side (25) of the filter element (21), and the flow through the filter element is radially from the outside inward. Integrating the pressure regulator (11) in the cap enables a simple, compact, economical design of the liquid filter (10), through whose valve (36) in the pressure regulator (11) only cleaned fuel flows.

13 Claims, 4 Drawing Sheets

LIQUID FILTER WITH INTEGRAL PRESSURE REGULATOR

BACKGROUND OF THE INVENTION

The invention is based on a liquid filter with a built-in pressure regulator for fuels.

A liquid filter of this kind, with a built-in pressure regulator for fuels, is known from U.S. Pat. No. 5,078,167, in which the otherwise separate components, such as the filter and pressure regulator, are combined in a common unit, of the kind known as returnless fuel systems (RLFSs). In this liquid filter, the pressure regulator functions with a diaphragm, which is acted upon by the pressure to be regulated at the outflow connector, counter to the force of a spring. A disadvantage of this liquid filter is that here the flow through the filter is from the inside outward, which can greatly reduce its service life, since dirt deposits can form bridges that reduce the inlet cross sections. This is especially critical when there are large amounts of dirt. Also, the pressure must be returned to one side of the diaphragm from the clean side of the filter, thus necessitating the formation of a chamber at the diaphragm, which is complicated. Another unfavorable aspect is that the pressure regulator is connected between the inflow connector and the tank connector, and accordingly is located entirely on the dirty side of the filter element. As a result, dirt particles can get into the valve of the pressure regulator and impair its function. In this pressure regulator, the valve itself is a component that is separate from the diaphragm, and thus this liquid filter with its pressure regulator is relatively complicated and expensive in design and requires many shaped sheet-metal parts. Moreover, this filter is designed to be installed in a tank and is poorly suited to be connected by means of lines.

A liquid filter with a built-in pressure regulator is also known from U.S. Pat. No. 4,011,848, in which the liquid filter is embodied essentially as a line-type filter, with the inflow connector and outflow connector disposed on the opposed face ends of the housing. A third connector leads radially and laterally away from the housing to the tank, in which a simple ball valve is provided as the pressure regulating valve. An additional safety valve is also associated with the outflow connector and is intended to block the connection to the tank if the fuel supply fails. Once again, in this liquid filter the pressure regulator is connected directly to the dirty side. The pressure regulator here functions without a diaphragm, and because of the ball valve used it is relatively imprecise and is vulnerable to soiling. From the standpoint of being built in, the fact that the connectors for the outflow connector and the tank connector are at right angles to one another is highly unfavorable in many applications. Furthermore, German patent document DE 42 42 242 A1 discloses a device for supplying the internal combustion engine of a motor vehicle with a fuel from a supply tank, in which several components are assembled to an aggregate. A filter element through which fuel flows axially or radially is arranged in a joint housing. It is; ring-shaped and arranged concentrically to the longitudinal axis of a fuel pump. The clean side of the filter element is connected directly with the suction connection of the fuel pump. A tubular connection branches from an outwardly expanding pressure connector of the fuel pump, and a spring loaded membrane pressure regulator which is arranged externally on the aggregate housing is connected with the tubular connection. The discharge side of the pressure regulator is unloaded to the dirty side of the filter element An integration of the pressure regulator in the filter is not provided in this aggregate.

SUMMARY OF INVENTION

The liquid filter according to the invention with a built-in pressure regulator for fuels, as defined by the characteristics of the body of the main claim, has the advantage over the prior art that with this integration of the pressure regulator in the liquid filter, an extremely simple, compact, economical design is made possible. Since the pressure regulator is acted upon by pressure fluid only from the clean side, only cleaned fuel flows through all of its components, thus precluding wear or leaks caused by trapped dirt particles. Moreover, with this design, it can be assured that the flow through the filter element is in the correct direction, from the outside inward, so that service lives as long as for a filter alone are attained. The liquid filter with the integrated pressure regulator can be installed easily and simply at any arbitrary location in the vehicle; no additional connectors on the tank are needed. The integrated design of the pressure regulator allows an especially easy-to-assemble kind of construction, which because of its economical design is even suitable for a disposable filter. The quantity of liquid flowing out when the pressure regulator responds can flow away relatively unhindered, which makes for a compact, small structural size. The threat of flow noise and pressure pulsations is considerably reduced as well, since in a distinction from pressure regulators known until now, the liquid stream is guided without major deflection and has an essentially steady course from the inlet to the outlet. The pressure regulator favorably compensates for any possible pressure drop that might be caused by clogging of the filter, because the regulating takes place on the clean side.

Advantageous further features of and improvements to the liquid filter with a built-in pressure regulator are possible by means of additional provisions For instance, as a result, the connectors for the inlet and the return flow are located on one side of the filter, so that only short hoses from the filter to the tank are needed. It is also favorable if cap of the filter housing and the pressure regulator are a component group that can be preassembled before installation, and the pressure regulator of this unit is also adjustable. It is also expedient for the clamping point, which otherwise, in external pressure regulators, is critical to tightness, to be located now in the interior of the filter housing; the filter housing itself is sealed off from the outside, and the tightness problem is thus considerably alleviated. According to further, features especially simple and compact designs are attainable that in particular lend themselves to use as a disposable filter. In further versions, the symmetrical embodiment of the filter insert makes it unnecessary to install the filter insert in a particular orientation, thus making it simpler, faster, and less expensive to produce. It is moreover attained that because of the press fit of the filter housing, filter insert and cap, a positive force on the clamping or crimping point of the diaphragm always ensues, thus lessening the threat that the diaphragm with creep outward at its outer edge. Another economical factor in the present liquid filter is that some of the housing for the pressure regulator is now replaced by the filter cap, thus omitting one expensive component that is usually made of special steel. The liquid filter with the integrated pressure regulator is also advantageously embodied such that it is suitable for being made of aluminum, steel, or plastic. The housing parts can also be separable connected, so that the filter element can be replaced by itself, leaving the rest in place. Other advantageous features will become apparent from the other claims, the description and the drawing.

DESCRIPTION OF THE DRAWING

Four exemplary embodiments of the invention are shown in the drawing and described in further detail in the description below.

DESCRIPTION OF THE PREFERRED EMBODIMENTS

Figure 1:
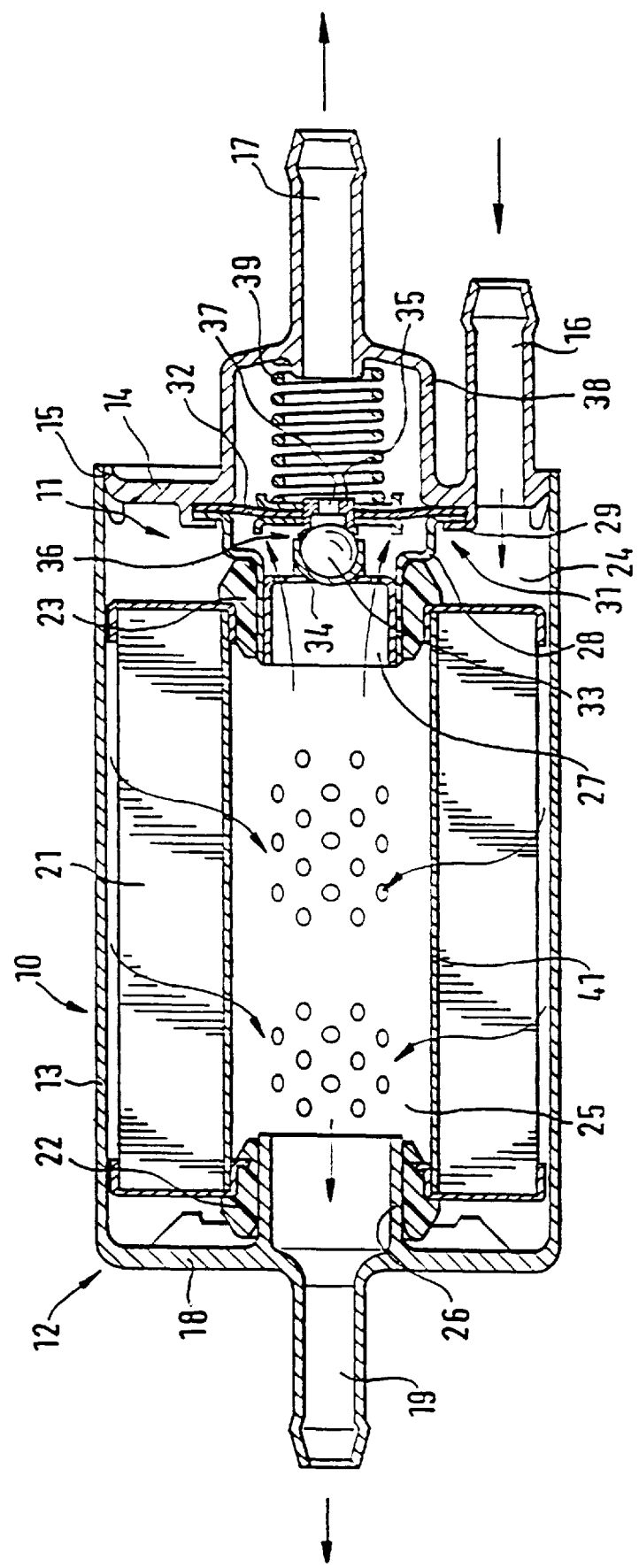
FIG. 1 is a longitudinal section through a first exemplary embodiment of a liquid filter with a built-in pressure regulator for fuel, in a simplified illustration.

FIG. 1 shows a liquid filter 10 with a built-in pressure regulator 11 for fuels; the liquid filter 10 is essentially embodied as a. line-type filter, and the pressure regulator 11 is integrated in the cap.

The liquid filter 10 has a housing 12 of aluminum, which substantially comprises a cup-shaped housing part 13 and an associated cap 14. The two housing parts 13, 14 are welded together at their outer edge 15, which can be done in particular by laser welding. An inflow connector 16 is formed on the cap 14, and by way of it fuel arriving from the tank is supplied to the liquid filter 10. A tank connector 17 is also embodied on the cap 14, and by way of it fuel can flow away to the tank when the pressure regulator 11 responds. An outflow connector 19 is provided on the bottom 18 of the cup-shaped housing part 13, and by way of it cleaned fuel leaves the liquid filter 10 and is carried in the direction of injection valves. The tank connector 17 and the outflow connector 19 are coaxial with one another in the longitudinal axis of the liquid filter 10, while the inflow connector 16 parallel to them is offset radially outward on the cap 14 and is located on the outer edge of the cap. All the connectors 16, 17, 19 are embodied as tubular connector stubs for hose connections.

In the interior of the housing 12, between the inflow connector 1e and the outflow connector 19, there is a filter element 21, which here is embodied as a star-type insert, known per se, with a radial flow through it from the outside inward. The filter element 21 is embodied with identical annular profiled seals 22, 23, with whose aid sealing between the dirty side 24 communicating with the inflow connector 16 and the clean side 25 communicating with the outflow connector 19 is achieved. To that end, an inward-protruding tubular connector stub 26 is embodied on the bottom 18 of the cup-shaped housing part 13; the filter element 21 is retained with its profiled seal 22 on this tubular connector stub, thus assuring sealing. With the other profiled seal 23, the filter element 21 is seated on a sleevelike portion 27 of a support element 28 that at the same time forms part of the pressure regulator 11. The filter element 21 is embodied symmetrically, and it has profiled seals 22, 23 that are identical to one another; thus it need not be installed in a particular orientation, and it can be built in anywhere in the housing 12.

The support element 28 is embodied essentially as a tubular part with multiple reductions in its diameter; on its end opposite the sleevelike portion 27, it terminates in an annular collar 29, with which it is secured on the inside of the cap 14 in a circular clamping point 31 that extends all the way around. This clamping point 31 is embodied as a crimped point and additionally serves to clamp a circular diaphragm 32 of the pressure regulator 11 tightly and firmly by its outer circumference. The clamping point 31 thus takes on a dual function, and it has an outer diameter that is as large as possible, so that there is still just enough room to install the inflow connector 16. Thus together with the profiled seal 23, the support element 28, secured tightly to the clamping point 31, assures sealing between the dirty side 24 and the clean side 25. The tubular support element, in its interior 28, has a valve body 33, here embodied as a ball, that is supported in a fixed manner relative to the housing. Annularly evenly distributed through openings 34 are provided between the valve body 33 and the sleevelike portion 27, so that the fuel can flow unhindered from the clean side 25 through these openings 34 and can act upon the diaphragm 32 on its side toward the filter element 32.

A valve seat 35 is disposed centrally in the movable diaphragm 32; it cooperates with the ball-like valve body 33 in the support element 28 and in this way forms the actual valve 36 of the pressure regulator 11. The valve seat 35 itself has a central opening 37, so that when the pressure regulator 11 responds, the valve 36 opens, and there is a flow through the inside of the diaphragm 32. The cap 14, in the region between the diaphragm 32 and the hose connector for the tank connector 17, has its a domelike bulge 38 shaped on its outside, which is spanned on the inside of the housing 12 by the diaphragm 32. This bulge 38, in its interior, receives a spring 39 of the pressure regulator 11, which is braced on one end on the tank connector 17 and on the other on the diaphragm 32. The spring 39 is embodied as so large in diameter that an unhindered outflow of the pressure fluid can take place, through the valve seat 35 to the tank connector 17.

The mode of operation of the liquid filter 10 with the integrated pressure regulator 11 will be explained as follows:

The fuel, as a rule coming from a tank, is supplied to the liquid filter 10 via the inflow connector 16 and reaches the dirty side 24 of the filter in the interior of the housing 12. The fuel flows through the filter element 21 radially from the outside inward and passes, cleaned, to the clean side 25, which is essentially refined by the center tube 41 of the filter element 21, and from there flows at least partly via the outflow connector 19 in the direction of the consumer, which in the present case is injection valves. Via the through openings 34 in the support element 28, the pressure prevailing on the clean side 25 also acts upstream of the valve 36 on the side of the diaphragm 32 toward the filter element 21, which is urged in the opposite direction by the spring 39. A certain pressure is preset by way of this spring 39. If this preset pressure in the pressure regulator 11 is exceeded, then the valve 36 opens, and fuel can flow out from the clean side 25 via the opened valve 37 and the opening 37 in the valve seat 35 and, unhindered by the spring 39, via the tank connector 17 to the tank. When the valve 36 opens, the valve seat 37, movably supported in the diaphragm 32, lifts away from the ball-like valve body 33 that is supported fixedly relative to the housing. Since the pressure regulator 11 is acted upon only from the direction of the clean side 25, all of its components experience a flow only of cleaned fuel, and thus wear or leaks caused by dirt particles is precluded. At the same time, because the pressure regulator 11 is integrated in the cap, it is assured that the flow through the filter element 21 will be radially from the outside inward, and as a result longer service lives are attainable than would be the case if the flow direction were reversed. Because all the connectors 16, 17, 19 are embodied on the housing 12, especially in the axial direction, the liquid filter 10 can be installed at any arbitrary place in a vehicle, thus keeping the effort and expense of installation relatively slight. The cap 14 and the integrated pressure regulator 11 forms an installation unit, which can be preassembled and is easy to handle and install, and in which the pressure regulator 11 can also be adjusted. Because of the location of the clamping point 31 for the pressure regulator 32 in the interior of the housing 12, sealing it off from the outside is unnecessary, and thus the problem of tightness, above all from the standpoint of safety considerations, is greatly alleviated. Embodying the tank connector 17 and the inflow connector 16 on the same end of the housing assures that only relatively short hose connections from the liquid filter 10 to the tank are needed. Integrating the pressure regulator 11 in the cap makes an extremely compact, simple and economical construction possible, especially since the cap 14 takes on sealing functions for both the liquid filter 10 and the pressure regulator 11. Since the demands on the pressure regulator 11 in terms of corrosion are now reduced considerably because of the components that are now mounted on the inside, and since moreover the liquid filter 10 is designed as a disposable part, simpler equipment can be used in its manufacture. In particular, zinc-plated or chromium-plated steel can be used, for instance. This design of the liquid filter 10 with the pressure regulator 11 also has the advantage that because of the press fit of the housing 12, filter element 21 and cap 14, a kind of press fit is attained, and a positive force is always exerted on the crimped clamping point 31, so that the danger of outward creep of the diaphragm 32 is lessened.

Figure 2:
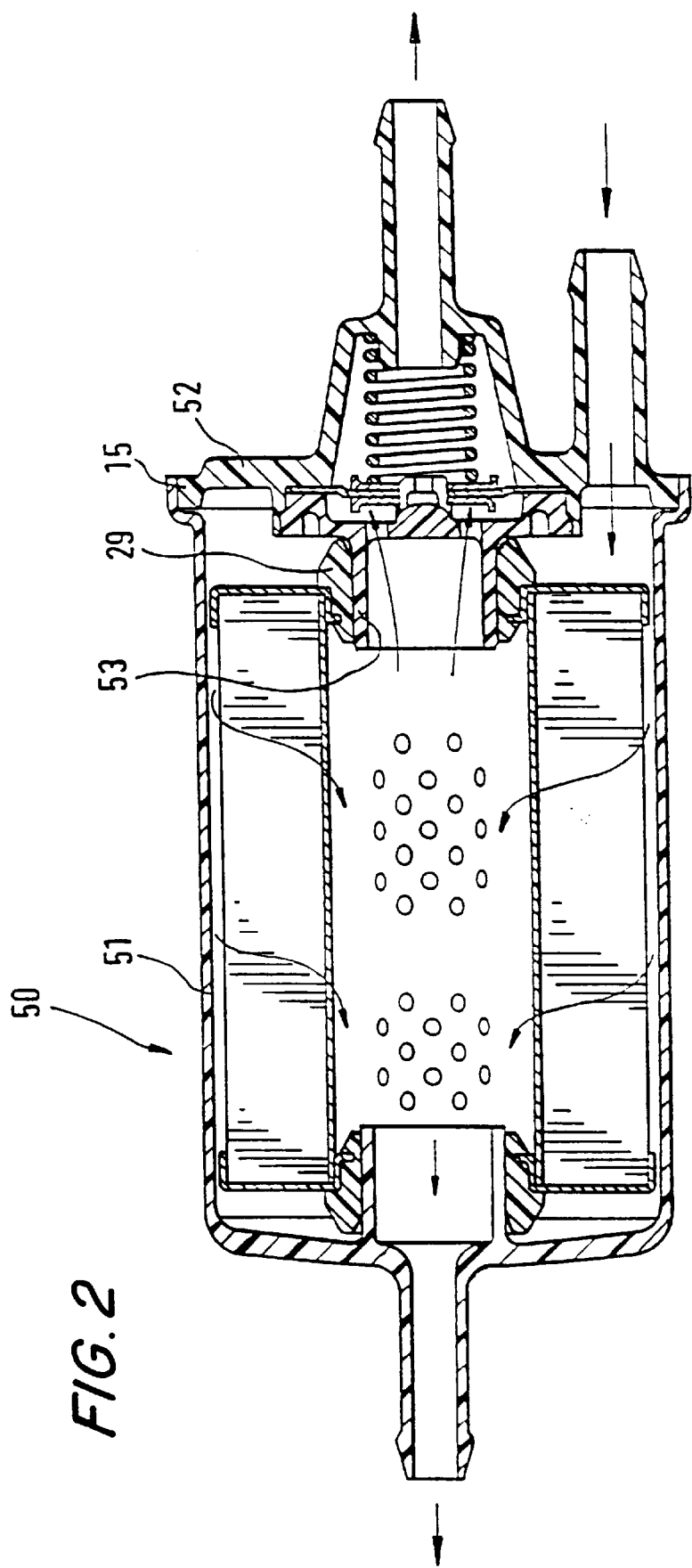
FIG. 2 is a longitudinal section through a second exemplary embodiment for a version made of plastic.

FIG. 2 shows a longitudinal section through a second liquid filter 50, which differs from the liquid filter 10 of FIG. 1 as follows; identical reference numerals will be used for identical elements.

Unlike the first liquid filter 10, made of aluminum, the second liquid filter 50 has a cup-shaped housing part 51, a cap 52, and a support element 53 that are all embodied as plastic parts. The housing part 51 and the cap 52 can be joined tightly and firmly together at their edge 15 by ultrasonic or friction welding. In a corresponding way, the collar 52 of the support element 53 can be joined firmly to the cap 52. The mode of operation of the second liquid filter 50 is equivalent to that of the first liquid filter 10 of FIG. 1.

Figure 3:
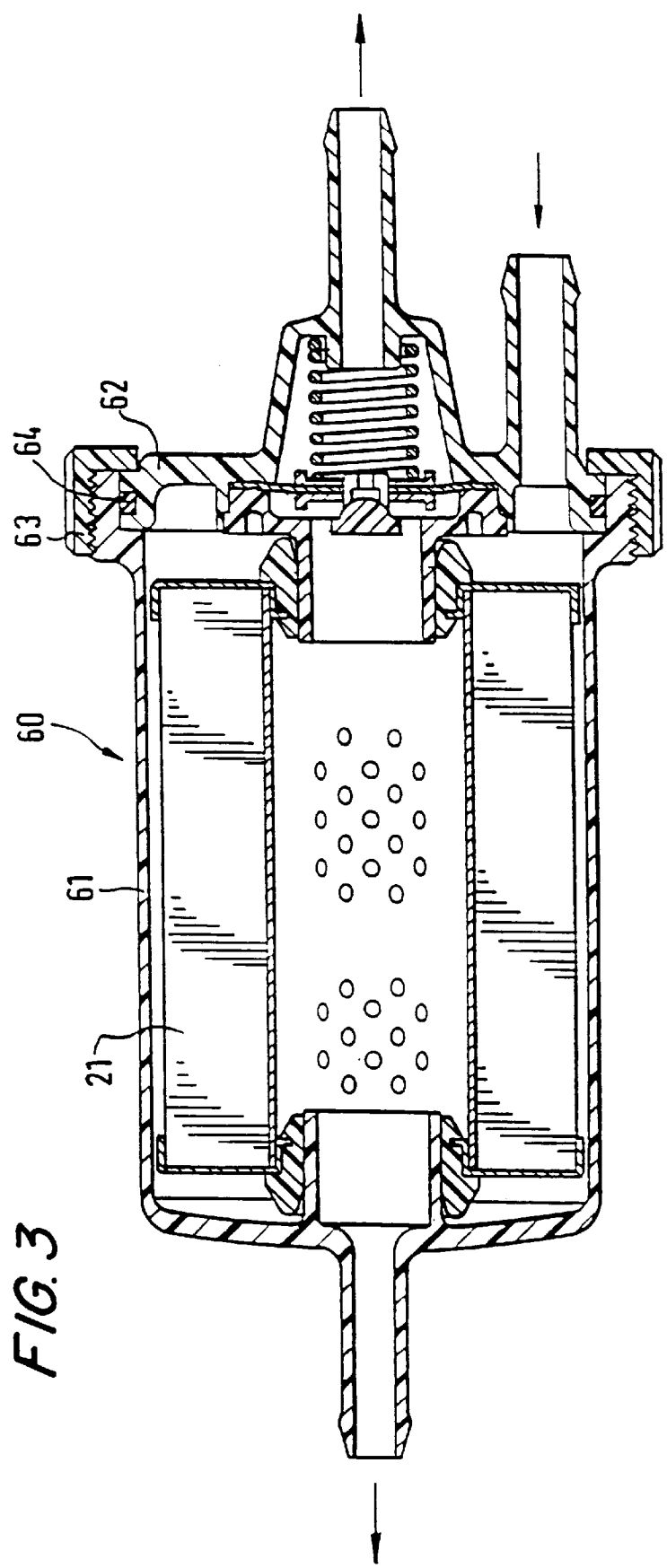
FIG. 3 is a longitudinal section through a third exemplary embodiment with a replaceable filter element.

FIG. 3 shows a longitudinal section through a third liquid filter 60, which differs from the second liquid filter 50 of FIG. 2 as follows; identical reference numerals will be used for identical elements. In the third liquid filter 60, the cup-shaped housing part 61 and the cap 62 are separably joined to one another by a union nut 63. The sealing between the housing part 61 and the cap 62 is accomplished by an O-ring 64. In the third liquid filter 60, it is possible to change the filter element 21 by itself. To change the filter element 21, the union nut 63 is opened, the cap 62 is removed, and the filter element 21 is replaced. Once again, the housing 61, 62 can be a plastic construction. Otherwise, the mode of operation of the third liquid filter 60 with the pressure regulator 11 is equivalent to that of the first liquid filter 10.

Figure 4:
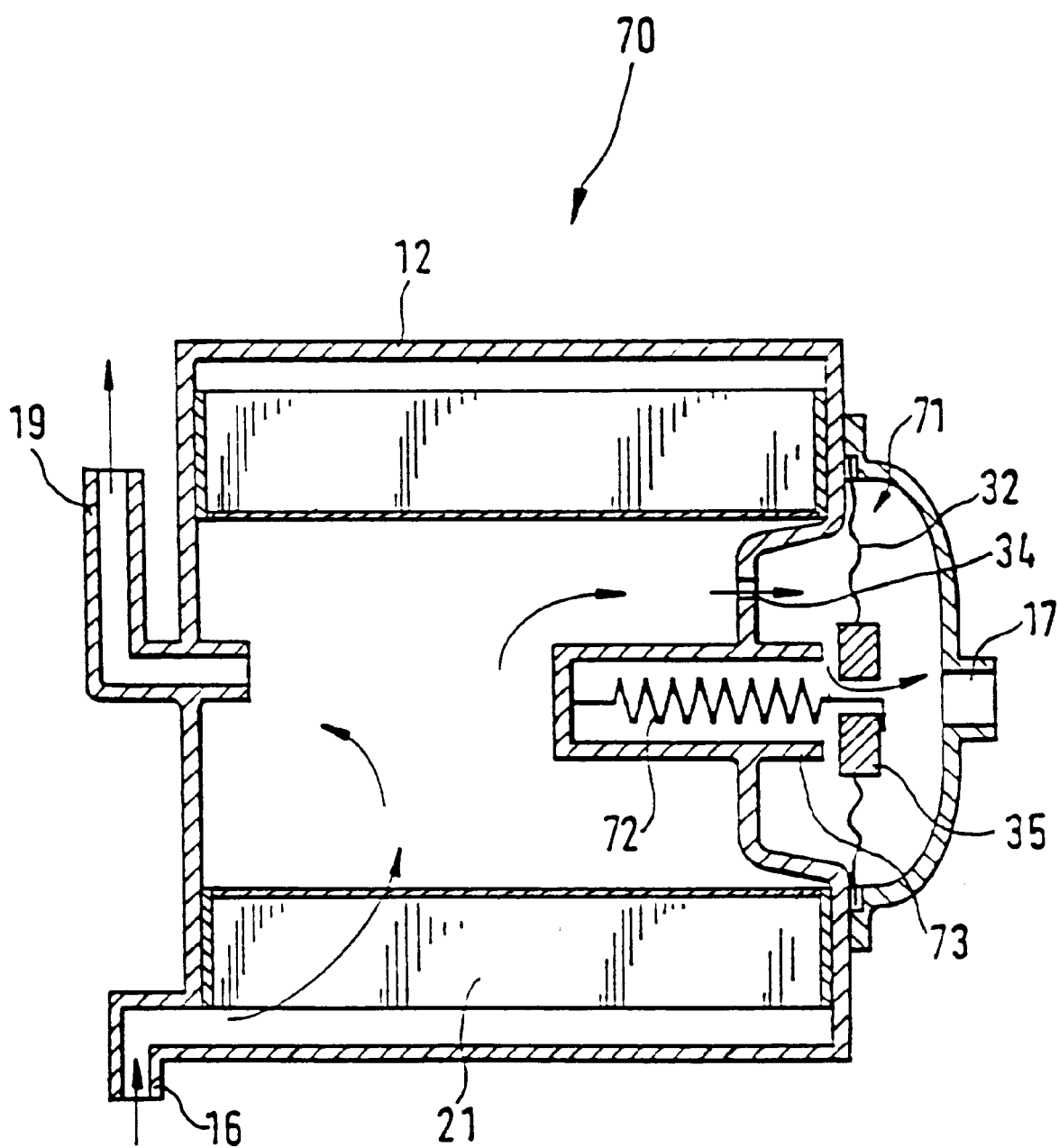
FIG. 4 shows a fourth exemplary embodiment, in a highly simplified illustration.

FIG. 4 shows a longitudinal section through a fourth liquid filter 70, in a highly simplified illustration; it differs from the first liquid filter 10 basically as follows; identical reference numerals will be used for identical elements.

The fourth liquid filter 70 used a different pressure regulator 71, in which instead of the compression spring 39 of the above embodiments, a tension spring 72 is now used. In this way, the location of the tension spring 72 can now be shifted into the installation space of the filter element 21. The valve body 33 attached to the housing and associated with the movable valve seat 35 in the diaphragm 32, is embodied here as an annular seat 73. In the fourth liquid filter 70, the space required can be reduced even further.

It is understood that modifications to the exemplary embodiments shown are possible without departing from the concept of the invention. The liquid filter 10 with the integrated pressure regulator 11 can readily be embodied in such a way that in addition to a construction using aluminum, steel or plastic, construction with mixed materials is also possible. The location of the inflow connector 16 may also be shifted as needed to the other end of the housing. Integrating the pressure regulator and its internal-flow diaphragm inside the housing cap represents an especially advantageous combination.

What is claimed is:

1. A liquid filter, comprising a pressure regulator for fuel with a pressure regulator valve; and a filter unit including a housing with a filter element located between a dirty side and a clean side of said housing so that fuel flows through said filter element radially from outside inwards; and inflow connector connected to said dirty side of said housing, an outflow connector connected to said clean side of said housing; said housing also having a tank connector arranged so that a liquid flowing through said pressure regulator valve flows out of said connector upon a response of said pressure regulator; a diaphragm forming a movable valve member of said pressure regulator and loaded by a liquid pressure counter to a spring action so as to control said pressure regulator valve, said pressure regulator being connected between said clean and said tank connector, said diaphragm being formed and arranged so that a liquid stream flowing away to said tank connector flows through an inside of said diaphragm, said housing having a cup-shaped housing part and a one-piece cap secured with said cup-shaped housing part and has a tubular support member on which said filter element is tightly supported, said pressure regulator and said tank connector being disposed coaxially to one another on said cap, said cap having a concentric wall, said diaphragm having a clamping point which is located on an outer circumference of said diaphragm on said concentric wall of said cap, said diaphragm being non-releasably mounted on said cap, said tank connector being located centrally in said cap; and an inflow connector located radially outside said clamping point.

2. A liquid filter as defined in claim 1, wherein said diaphragm is formed as a circular diaphragm.

3. A liquid filter as defined in claim 1, wherein said diaphragm controls a connection from said clean side to said tank connector.

4. A liquid filter as defined in claim 1; and further comprising a profiled seal, said cup-shaped part of said housing having a bottom provided with an inward-protruding tubular connector stub on which said filter element is tightly secured via said profiled seal, said filter element being formed symmetrically.

5. A liquid filter as defined in claim 1, wherein said outflow connector and said tank connector are located on a respective one of said cup-shaped housing part and said cap coaxially to one another.

6. A liquid filter as defined in claim 1, wherein said inflow connector is located in said cap and has a connector stub which is axially parallel to said tank connector and located on said cap radially outside said clamping point.

7. A liquid filter as defined in claim 1, wherein said cup-shaped housing part and said cap are composed of a material selected from the group consisting of metal and plastic and inseparably joined to one another.

8. A liquid filter as defined in claim 1, wherein said cap has an outwardly protruding, dome-like bulge which is spanned in an interior of said housing by said diaphragm and defines a spring chamber, said tank connector being located on said bulge; and further comprising a spring located in said spring chamber and braced between said diaphragm and said tank connector.

9. A liquid filter as defined in claim 1, wherein said cup-shaped housing and said cap are separably joined by a union nut, said pressure regulator being inseparably secured to said cap.

10. A liquid filter, comprising a pressure regulator for fuel and provided with a pressure regulator valve; and a filter unit including a housing with a filter element located between a dirty side and a clean side of said housing so that fuel flows through said filter element radially from outside inwards, an inflow connector connected to said dirty side of said housing; an outflow connector connected to said clean side of said housing, said housing also having a tank connector arranged so that a liquid flowing through said pressure regulator valve flows out of said tank connector upon a response of said pressure regulator; a diaphragm forming a movable valve member of said pressure regulator and loaded by a liquid pressure counter to a spring action so as to control said pressure regulator valve, said pressure regulator being connected between said clean side and said tank connector, said diaphragm being formed and arranged so that a liquid stream flowing away to said tank connector flows through an inside of said diaphragm, said diaphragm forming a movable valve member of said valve and controlling a connection from said clean side to said tank connector, said pressure regulator and said tank component being disposed on a same part of said housing, while said inflow connector being also located in the same part of said housing, said diaphragm having a centrally disposed, annular valve seat which cooperates with a valve body fixed to said housing so that said valve seat and said valve together from said valve of said pressure regulator, said housing having a cup-shaped housing part and a one-piece cap secured with said cup-shaped housing part and has a tubular support member on which said filter element is tightly supported, said pressure regulator and said tank connector being disposed coaxially to one another on said cap, said cap having a concentric wall, said diaphragm halving a clamping point which is located on an outer circumference of said diaphragm on said concentric wall of said cap being non-releasably mounted in said cap, said tank connector being located centrally in said cap; and an inflow connector located radially outside said clamping point.

11. A liquid filter, comprising a pressure regulator for fuel with a pressure regulator valve; and a filter unit including a housing with a filter element located between a dirty side and a clean side of said housing so that fuel flows through said filter element radially from outside inwards; and inflow connector connected to said dirty side of said housing, an outflow connector connected to said clean side of said housing; said housing also having a tank connector arranged so that a liquid flowing through said pressure regulator valve flows out of said connector upon a response of said pressure regulator; a diaphragm forming a movable valve member of said pressure regulator and loaded by a liquid pressure counter to a spring action so as to control said pressure regulator valve, said pressure regulator being connected between said clean and said tank connector, said diaphragm being formed and arranged so that a liquid stream flowing away to said tank connector flows through an inside of said diaphragm, said housing having a cup-shaped housing part and a one-piece cap secured with said cup-shaped part and has a tubular support member on which said filter element is tightly supported, said pressure regulator and said tank connector being disposed coaxially to one another on said cap, said cap having a concentric wall, said diaphragm having a clamping point which is located on an outer circumference of said diaphragm on said concentric wall of said cap, said diaphragm being non-releasably mounted in said cap, said pressure regulator and said tank connector being located in a same part of said housing, said inflow connector being also located on said same part of said housing.

12. A liquid filter, comprising a pressure regulator for fuel with a pressure regulator valve; and a filter unit including a housing with a filter element located between a dirty side and a clean side of said housing so that fuel flows through said filter element radially from outside inwards; and inflow connector connected to said dirty side of said housing, an outflow connector connected to said clean side of said housing; said housing also having a tank connector arranged so that a liquid flowing through said pressure regulator valve flows out of said connector upon a response of said pressure regulator; a diaphragm forming a movable valve member of said pressure regulator and loaded by a liquid pressure counter to a spring action so as to control said pressure regulator valve, said pressure regulator being connected between said clean and said tank connector, said diaphragm being formed and arranged so that a liquid stream flowing away to said tank connector flows through an inside of said diaphragm, said housing having a cup-shaped housing part and a one-piece cap secured with said cup-shaped part and has a tubular support member on which said filter element is tightly supported, said pressure regulator and said tank connector being disposed coaxially to one another on said cap, said cap having a concentric wall, said diaphragm having a clamping point which is located on an outer circumference of said diaphragm on said concentric wall of said cap, said diaphragm being non-releasably mounted in said cap; and a valve body fixed to said housing, said diaphragm having a centrally located annular valve seat which cooperates with said body and forms together with said body said valve of said pressure regulator.

13. A liquid filter, comprising a pressure regulator for fuel with a pressure regulator valve; and a filter unit including a housing with a filter element located between a dirty side and a clean side of said housing so that fuel flows through said filter element radially from outside inwards; and inflow connector connected to said dirty side of said housing, an outflow connector connected to said clean side of said housing; said housing also having a tank connector arranged so that a liquid flowing through said pressure regulator valve flows out of said connector upon a response of said pressure regulator; a diaphragm forming a movable valve member of said pressure regulator and loaded by a liquid pressure counter to a spring action so as to control said pressure regulator valve, said pressure regulator being connected between said clean and said tank connector, said diaphragm being formed and arranged so that a liquid stream flowing away to said tank connector flows through an inside of said diaphragm, said housing having a cup-shaped housing part and a one-piece cap secured with said cup-shaped part and has a tubular support member on which said filter element is tightly supported, said pressure regulator and said tank connector being disposed coaxially to one another on said cap, said cap having a concentric wall, said diaphragm having a clamping point which is located on an outer circumference of said diaphragm on said concentric wall of said cap, said diaphragm being non-releasably mounted in said cap; a sleeve-shaped profiled seal, said pressure regulator having a substantially tubular support with one end which is tightly secured to said cap and with another end supporting said filter element through said sleeve-like profiled seal; and a valve body fixed to said housing, said diaphragm having a movable valve seat, said valve body being located in said tubular Support and together with said movable seat forming said valve, said support element being provided with flow openings formed so that a liquid from said clean side acts upon said diaphragm on its side located upstream of said valve, said tubular support being tightly secured together with an outer edge of said diaphragm in said clamping point.

* * * * *